No. 694,943. Patented Mar. 11, 1902.
F. W. CARSON.
STEAM COOKER.
(Application filed Oct. 19, 1901.)
(No Model.) 2 Sheets—Sheet 1.
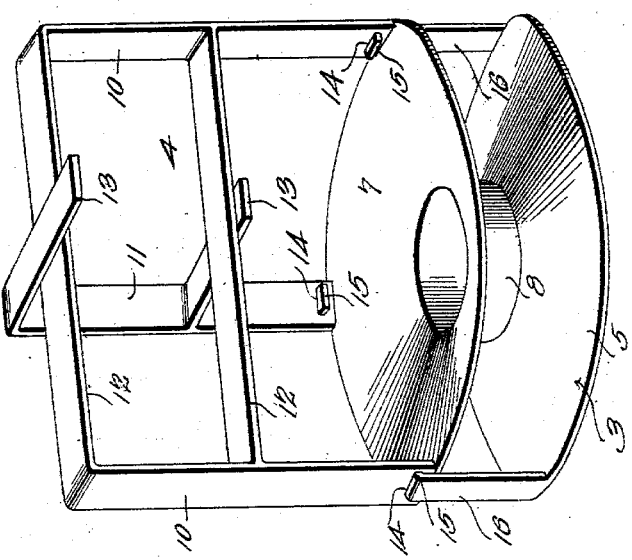
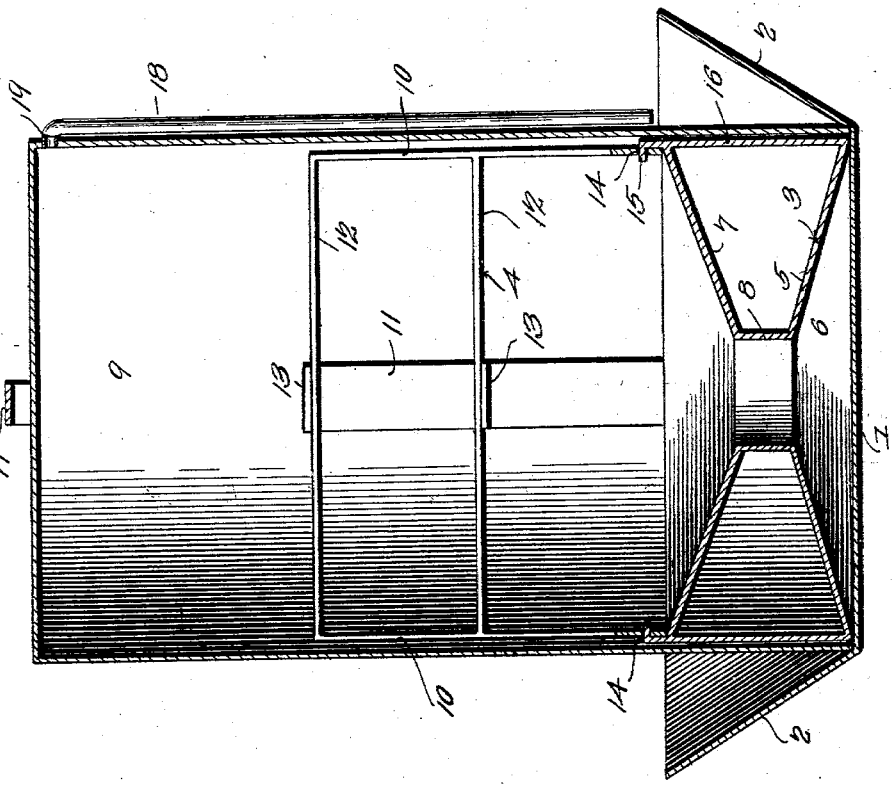
Witnesses
F. W. Carson, Inventor
by C. A. Snow & Co.
Attorneys No. 694,943. Patented Mar. 11, 1902.
F. W. CARSON.
STEAM COOKER.
(Application filed Oct. 19, 1901.)
(No Model.) 2 Sheets—Sheet 2.
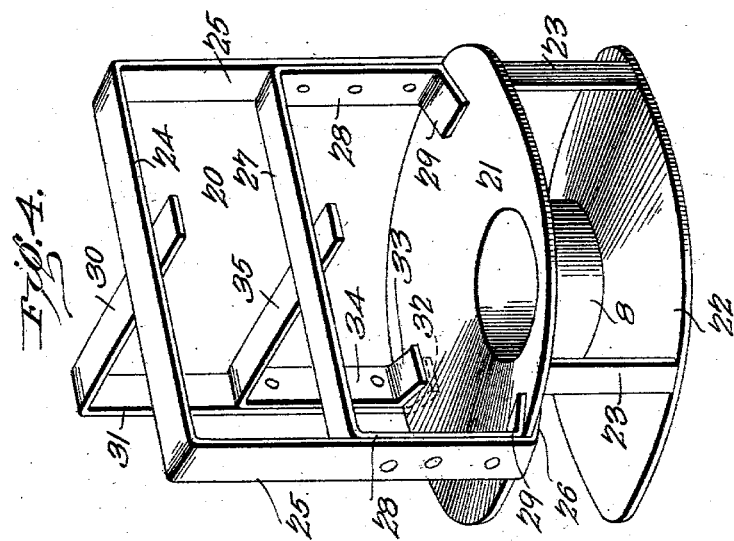
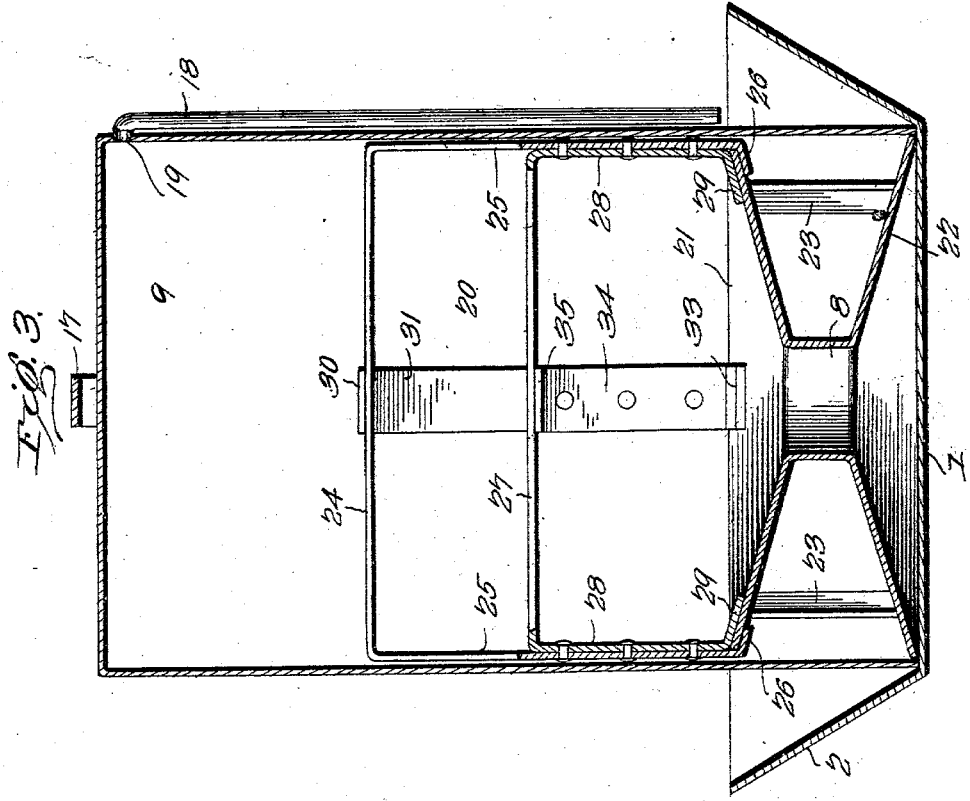

UNITED STATES PATENT OFFICE.

FRANK W. CARSON, OF SHELBY, OHIO.

STEAM-COOKER.

SPECIFICATION forming part of Letters Patent No. 694,943, dated March 11, 1902.

Application filed October 19, 1901. Serial No. 79,269. (No model.)

*To all whom it may concern:*

Be it known that I, FRANK W. CARSON, a citizen of the United States, residing at Shelby, in the county of Richland and State of Ohio, have invented a new and useful Steam-Cooker, of which the following is a specification.

The invention relates to improvements in steam-cookers.

The object of the present invention is to improve the construction of steam-cookers and to provide an exceedingly simple and inexpensive one adapted to be readily taken apart and cleaned after use and capable of reducing the consumption of fuel to a minimum.

A further object of the invention is to provide a steam-cooker of this character from which the rack for supporting the cooking-pans may be readily removed to enable the steamer to accommodate a large pan or other receptacle for canning fruit and similar operations.

The invention consists in the construction and novel combination and arrangement of parts hereinafter fully described, illustrated in the accompanying drawings, and pointed out in the claims hereto appended.

In the drawings, Figure 1 is a vertical sectional view of a steam-cooker constructed in accordance with this invention. Fig. 2 is a perspective view of the pan-rack and its base. Fig. 3 is a vertical sectional view of a steam-cooker, illustrating a modification of the invention. Fig. 4 is a perspective view of the pan-rack and the base of the same.

Like numerals of reference designate corresponding parts in all the figures of the drawings.

1 designates a pan or receptacle designed to be placed on a stove or other heater and adapted to form a reservoir for the water and preferably provided with inclined sides 2. The bottom of the pan or receptacle is horizontal and circular, and it receives a base 3 for a pan-rack 4. The base 3 consists of a lower conical plate 5, arranged directly on the bottom of the pan and fitting against the same adjacent to the sides and adapted to form a space or compartment between it and the bottom of the pan for the reception of a thin sheet of water, which is subjected directly to the effect of the heater, whereby a comparatively small heater will be sufficient to convert the small quantity of water in the space or compartment 6 into steam. This construction reduces the consumption of fuel to a minimum, and the plate 5 also prevents the water above it from boiling. As the water in the space or compartment is converted into steam the water surrounding the space or compartment will flow into the same under the edges of the bottom plate, so that there will always be a sufficient quantity of water in the space 6. The bottom plate of the base is connected with a reversely-arranged similarly-constructed top plate 7 by a short tubular neck 8, which is connected with the conical top and bottom plates at central openings thereof. The steam passes upward through the neck or tube 8 into the upper portion of a receiver or casing 9, which is placed over the rack and the base and which rests upon the bottom of the pan or receptacle 1, as clearly illustrated in Fig. 1 of the accompanying drawings. The rack is composed of upright bars 10 and 11 and horizontal pan-supporting bars 12 and 13, arranged as clearly shown in Fig. 2. The bars 10 are arranged at opposite sides of the base, and the bar 11 is located at the back of the same. The horizontal bars 12 connect the side bars 10, and the bars 13 extend forward from the rear supporting-bar 11 and project in advance of the transverse bars 12. The lower portions of the upright bars of the rack are resilient and are provided at their lower ends with openings 14 for the reception of inwardly-extending lugs 15 of the base, whereby the rack is detachably mounted on the same. The base is provided at its sides and back with braces 16, connecting the outer edges of the top and bottom plates and extending above the top one and provided at their upper terminals with the said lugs 15. The rack is adapted to receive various cooking-pans and other utensils, and it may be made of any desired capacity, as will be readily understood. By arranging the upright and horizontal bars of the rack as set forth the rack is open at its front to permit the cooking utensils to be readily placed on or removed from the horizontal bars when the casing or receiver is removed. The rack is detached by springing the resilient lower portions of the upright bars inward out of engagement with the lugs, and when the base and the rack are separated in this manner the parts may be conveniently cleaned after use; also, the rack is adapted to be removed to permit a pan or other receptacle to be placed directly upon the base when it is desired to use the cooker for canning fruit and other operations where a large receptacle is required.

The receiver or casing, which is cylindrical, is open at its bottom and closed at the top, which is provided with a suitable grip or handle 17, and the steam is permitted to escape at the upper portion of the receiver or casing through a pipe or tube 18, arranged on the exterior of the receiver or casing and extending from the upper portion of the same to a point adjacent to the top of the pan or receptacle 1. The pipe or tube which constitutes the steam-escape is provided at its upper end with an arm or elbow 19, which extends through the wall of the receiver or casing; but any other form of steam-escape may be provided.

It will be seen that the steam-cooker is simple and comparatively inexpensive in construction, that it is adapted to be operated by a minimum amount of fuel, and that the parts may be readily separated to enable them to be conveniently cleaned after the cooker has been in use.

Instead of interlocking the pan-rack with the base, as illustrated in Fig. 2 of the accompanying drawings, the parts may be constructed as illustrated in Figs. 3 and 4. The rack 20 (shown in Figs. 3 and 4) is detachably engaged with the top disk or plate 21 of the base 22, which is constructed substantially the same as that heretofore described, with the exception that the braces 23, which support the outer edges of the upper and lower disks or plates, do not project above the base.

The upper horizontal bar 24 of the pan-rack is formed integral with upright side bars 25, which have their lower ends bent inward at an angle to form lower lugs 26, and the lower horizontal supporting-bar 27 is provided with reinforcing side bars 28, riveted or otherwise secured to the lower portions of the side bars 25 and having their lower terminals bent inward at an angle to form inwardly-extending lugs or flanges 29, arranged parallel with the lower lugs or flanges 26 and projecting beyond the same. The lugs or flanges 26 and 29, which are arranged parallel with each other, are disposed at a slight inclination to each other and are spaced apart to receive the opposite edges of the upper disk or plate of the base, as clearly illustrated in Fig. 3 of the accompanying drawings. The supporting-bar 30, which extends from the back of the pan-rack and which is suitably secured to the top bar 24, is formed integral with a rear supporting-bar 31, having its lower end 32 bent inward at an angle to form a lug or flange which is arranged parallel with an upper lug or flange 33. The upper lug or flange 33 is formed integral with a reinforcing rear bar 34, which consists of an extension of the horizontal supporting-bar 35. The horizontal supporting-bar 35 is suitably secured to the lower transverse supporting-bar 27. The upper and lower lugs or flanges, which are arranged at the upper and lower faces of the upper disk or plate of the base, conform to the configuration of the same and are adapted to be readily engaged with and disengaged from the base, and they provide a firm and steady support for the pan-rack.

Instead of providing the reinforcing portions 28 and 34 these parts may be omitted, and the lugs or flanges may be constructed in any other suitable manner.

What I claim is—

1. A steam-cooker comprising a base consisting of a bottom conical plate, an inverted top conical plate, a neck connecting the plates at the center thereof, the vertical braces connecting the plates at their outer peripheries, a rack open at the front and provided at the sides and back with upper bars detachably interlocked with the upper plate at the outer periphery of the same, a receiver arranged over the rack and over the base, and a receptacle receiving the base and the receiver and having inclined walls extending upward to approximately the plane of the top of the base, substantially as described.

2. A steam-cooker comprising a receptacle, a base having a bottom plate arranged on the bottom of the receptacle and forming a space between it and the said bottom, said base being provided at its top with lugs, a rack provided with resilient supporting-bars detachably interlocked with the lugs, and a receiver or casing, substantially as described.

3. A steam-cooker comprising a receptacle, a base provided with the reversely-arranged upper and lower plates connected together, said base being provided at the outer edges of the plates with braces connecting the plates and provided at the top of the base with lugs, and a removable rack interlocked with the lugs, substantially as described.

4. A steam-cooker comprising a base, a receptacle receiving the base, a rack composed of the upright side bars interlocked with the base, the transverse bars connecting the side bars, the rear upright bar also interlocked with the base, and the horizontal bars extending from the rear upright bar to the transverse bars, and a casing or receiver, substantially as described.

In testimony that I claim the foregoing as my own I have hereto affixed my signature in the presence of two witnesses.

FRANK W. CARSON.

Witnesses:
B. F. LONG,
A. B. MABEE.